(12) United States Patent
Klimpel et al.

(10) Patent No.: US 11,447,262 B2
(45) Date of Patent: Sep. 20, 2022

(54) INERTING SYSTEM AND METHOD FOR AN AIRCRAFT USING EXHAUST AIR

(71) Applicant: AIRBUS OPERATIONS GMBH, Hamburg (DE)

(72) Inventors: Frank Klimpel, Hamburg (DE); Alexander Solntsev, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 615 days.

(21) Appl. No.: 16/511,701

(22) Filed: Jul. 15, 2019

(65) Prior Publication Data
US 2019/0352016 A1 Nov. 21, 2019

Related U.S. Application Data

(62) Division of application No. 15/010,675, filed on Jan. 29, 2016, now Pat. No. 10,392,122.

(30) Foreign Application Priority Data

Jan. 30, 2015 (DE) ............ 10 2015 201 609.9

(51) Int. Cl.
*B64D 37/32* (2006.01)
*A62C 3/08* (2006.01)
(Continued)

(52) U.S. Cl.
CPC ............ *B64D 37/32* (2013.01); *A62C 3/08* (2013.01); *A62C 99/0018* (2013.01); *B64D 13/06* (2013.01); *B64D 2013/0648* (2013.01)

(58) Field of Classification Search
CPC ........ B64D 37/32; B64D 41/00; B64D 13/02; B64D 13/06; B64D 2013/0648; A62C 99/0018; A62C 3/08
See application file for complete search history.

(56) References Cited

U.S. PATENT DOCUMENTS 7,152,635 B2 * 12/2006 Moravec .......... B64D 37/32
  141/82
7,410,526 B2 * 8/2008 Haas .......... B64D 13/06
  96/108
(Continued)

FOREIGN PATENT DOCUMENTS

DE   10 2004 017 879 A1   11/2005
EP      2 824 744 A1   1/2015
WO   WO 2013/151690 A1   10/2013

OTHER PUBLICATIONS

German Search Report for Application No. 10 2015 201 609.9 dated Nov. 26, 2015.
(Continued)

*Primary Examiner* — Valentina Xavier
(74) *Attorney, Agent, or Firm* — Jenkins, Wilson, Taylor & Hunt, P.A.

(57) ABSTRACT

An inerting system and method for an aircraft includes an inert gas generation apparatus, an air supply line, a compressor and an inert gas line. The compressor supplies the inert gas generation apparatus with air from the air supply line at a pressure necessary for operation of the inert gas generation apparatus. The inert gas line carries the inert gas produced by the inert gas generation apparatus on to an inert gas consumer. The air supply line is connected to an exhaust air system of the aircraft. A method for supplying an inert gas in an aircraft includes tapping of air from an exhaust air system of the aircraft, compression of the tapped air, and production of inert gas in an inert gas generation apparatus from the compressed air. An aircraft is disclosed in which such an inerting system is arranged and/or used.

6 Claims, 4 Drawing Sheets

(51) Int. Cl.
　　　*A62C 99/00*　　　　(2010.01)
　　　*B64D 13/06*　　　　(2006.01)

(56) References Cited

U.S. PATENT DOCUMENTS

| | | | |
|---|---|---|---|
| 9,102,416 B1* | 8/2015 | Cutler | ................ A62C 99/0018 |
| 9,346,555 B2* | 5/2016 | Massey | ................... F04C 18/16 |
| 10,392,122 B2 | 8/2019 | Klimpel et al. | |
| 2005/0223895 A1* | 10/2005 | Wong | ..................... B64D 37/32 |
| | | | 95/148 |
| 2007/0062371 A1* | 3/2007 | Eilers | ..................... B64D 13/06 |
| | | | 95/138 |
| 2010/0050393 A1* | 3/2010 | Clark | ..................... H01L 31/18 |
| | | | 23/300 |
| 2013/0294950 A1* | 11/2013 | Massey | .................. B64D 37/32 |
| | | | 418/83 |
| 2014/0360445 A1* | 12/2014 | Reynolds | ............ F02B 29/0418 |
| | | | 165/96 |
| 2016/0229548 A1 | 8/2016 | Klimpel et al. | |
| 2021/0380269 A1* | 12/2021 | Sipprell | ................. B64D 37/32 |

OTHER PUBLICATIONS

Restriction Requirement for U.S. Appl. No. 15/010,675 dated Jul. 2, 2018.
Non-Final Office Action for U.S. Appl. No. 15/010,675 dated Dec. 13, 2018.
Notice of Allowance for U.S. Appl. No. 15/010,675 dated Apr. 22, 2019.

* cited by examiner

INERTING SYSTEM AND METHOD FOR AN AIRCRAFT USING EXHAUST AIR

CROSS-REFERENCE TO RELATED APPLICATIONS

This application is a divisional application of and claims priority to U.S. patent application Ser. No. 15/010,675, filed Jan. 26, 2016, which claims priority to German Patent Application DE 10 2015 201 609.9, filed Jan. 30, 2015, the entire disclosures of which are incorporated by reference herein.

TECHNICAL FIELD

The disclosure herein relates to an inerting system for an aircraft, a method for supplying an inert gas in an aircraft and an aircraft in which is such an inerting system is arranged, as well as an aircraft in which a corresponding inerting system is used.

BACKGROUND

In airplanes (termed "aircraft" below), air enriched with nitrogen is conducted into an aviation fuel tank and/or a trim tank to reduce the risk of explosion. Air with a normal oxygen and nitrogen content can create a highly flammable mixture together with aviation fuel vapours. Nitrogen-enriched air is also used in extinguisher systems, in order to smother any fire sources by increasing the nitrogen content, with a resultant reduction in the oxygen content. The nitrogen-enriched air is produced by inerting systems. These are also termed inert gas systems, Inert Gas Generation Systems (IGGS) or On Board Inert Gas Generation Systems (OBIGGS). Cooled bleed air from jet engines or auxiliary turbines (so-called auxiliary power units, APUs) is used as an air source for the inert gas production. However, this bleed air has a temperature of roughly 200° C. and must therefore be cooled to a temperature tolerable for the IGGS. Furthermore, the air supplied to the IGGS must also have a certain pressure, and must be compressed or expanded, therefore. Systems that supply air with these predetermined temperature and pressure characteristics are described as a CSAS (Conditioned Service Air System).

FIG. 1 illustrates a known CSAS, which represents an air supply for an IGGS 100. The bleed air 110 branched off from an engine is supplied to a compressor 120 or even an expansion device. In FIG. 1, a motor-operated compressor 120 is shown, which supplies the bleed air 110 at the pressure required for operating the IGGS 100. Bleed air 110 that has a pressure higher than that required can also be routed past the compressor by a valve 125 and supplied, suitably expanded, to the IGGS. Since the bleed air usually has a temperature that is too high for use in the IGGS 100, or the bleed air 110 is additionally heated by the compressor 120, it has to be cooled with the help of a heat exchanger 130. The bleed air 110 can optionally be pre-cooled before entering the compressor 120 in an upstream heat exchanger 135. For finer control of the temperature required in the IGGS 100, the CSAS comprises a bypass line with a suitable control valve 140. Finally, other regulating elements, such as e.g. regulating valves 150 and 160, are provided in the air lines of the CSAS. An ozone converter 165 can also be optionally integrated, which removes the ozone that is detrimental to the IGGS. The cooling in the heat exchangers 130/135, thus their heat sink, is effected by an air stream. This is produced by outside air, which is made available in flight mode as ram air of a ram air channel 180 and in ground operation by an additional conveying device, such as e.g. a ventilator or blower 170.

The present disclosure has recognized that the tapping of bleed air of an engine and the fitting of ram air channel inlets and outlets in the outer skin of an aircraft entail disadvantages for an IGGS. For example, the tapped bleed air is no longer available to the engine itself, which leads to increased fuel consumption. The fitting of ram air channel openings produces vortices on the outside of the aircraft, which likewise increase the aircraft's fuel consumption.

SUMMARY

An object of the disclosure herein, therefore, is to specify an inerting system and a corresponding method for supplying an inert gas in an aircraft, which reduces the overall consumption of fuel.

This object is achieved by an inerting system such as described herein.

An inerting system according to one aspect of the present disclosure comprises an inert gas generation apparatus for generating inert gas and an air supply line. Furthermore, a compressor is provided, which supplies the inert gas generation apparatus with air from the air supply line at a pressure required for the operation of the inert gas generation apparatus. The inerting system also comprises an inert gas line, which conducts inert gas generated by the inert gas generation apparatus to an inert gas consumer. The air supply line of the inerting system is advantageously connected to an exhaust air system of the aircraft.

The connection of the air supply line to an exhaust air system of the aircraft can be provided at a point that limits the length of the air supply line to a minimum. The inert gas generation apparatus (IGGS) is advantageously arranged in an area of the aircraft in which other air conditioning systems are also present. It is particularly advantageous if the IGGS is fitted in direct proximity to an exhaust air system for discharging consumed air from areas of the aircraft that require fresh air. Weight can be saved by the shortest possible air supply line.

Alternatively, the inerting system can even be integrated directly into an exhaust air line of an exhaust air system of the aircraft, provided that the exhaust air line has suitably large cross sections or can be realised with the necessary cross sections.

The compressor is advantageously a motor-driven compressor. For example, the compressor can be driven by an electric motor.

The inerting system can also comprise a heat exchanger, which cools air supplied by the compressor to a temperature required for the operation of the inert gas generation apparatus. Alternatively, the heat exchanger can also heat the air supplied by the compressor to a required temperature. Usually, however, heat is introduced into the supply air by the compressor, so that the supply air mostly has to be cooled.

Air from an area inside the aircraft advantageously serves the heat exchanger as a heat sink. Due to this, a ram air channel for the inerting system (IGGS) and corresponding openings in the outer skin of the aircraft can be eliminated. At least, existing ram air channels and openings that are necessary for other systems in the aircraft can be of smaller dimensions.

A blower can optionally be included in the inerting system. The blower produces an air stream from the air surrounding the inerting system, wherein the air stream flows through the heat exchanger and acts as a heat sink. The blower can be implemented by a ventilator or other fan, such as e.g. an impeller fan. Alternatively, another air stream, which is already present in the vicinity of the inerting system for other reasons, can also be used. Provided that such an air stream has a velocity and volume necessary for the operation of the heat exchanger, any other air stream can be used without the additional deployment of a blower.

According to one aspect of the present disclosure, the inerting system is arranged in an area of the aircraft that is not pressurized during flight operation of the aircraft. Usually at least one area of the aircraft, such as e.g. the cockpit, a passenger cabin and/or a cargo hold, is acted upon during flight operation by an increased pressure compared with the ambient air outside the aircraft, in order to create an environment necessary for life for persons and living beings in the aircraft at relevant flight altitudes. The inerting system is advantageously arranged in an area of the aircraft that lies outside this pressurized area, but naturally still within the aircraft. In this case the inerting system comprises a branch line, which branches off from the air supply line upstream of the compressor and supplies air serving as a heat sink to the heat exchanger. In other words, a branch line branches off from the air supply line, which leads from the exhaust air system of the aircraft to the compressor, ahead of the compressor. This branch line is arranged such that it carries air from the air supply line to the heat exchanger and flows through this. Due to a pressure difference between the exhaust air system and the unpressurized area, air now flows through the branch line. The branched-off air can thus be used as a heat sink in the heat exchanger. Furthermore, a shut-off valve can be arranged in the branch line to control the flow (flow rate) of the air supply through the branch line.

Floor areas in the aircraft fuselage, apex or roof areas of the fuselage, or also the tail of the aircraft can be considered as an area that is not pressurized. To guarantee an adequate supply of air for the IGGS, the exhaust air system is an exhaust air system of a passenger cabin, a cargo hold and/or another area of the aircraft that is pressurized during flight operation, such as e.g. a cockpit or sleeping areas for the crew arranged in the roof of the aircraft. Due to the pressure difference between these areas of the aircraft and thus within the exhaust air system from these areas and the area in which the inerting system is arranged, the noted advantages can be achieved.

In addition, the inerting system can comprise a control device, which controls the shut-off valve and the blower in such a way that the shut-off valve is open during flight operation, and air that flows through the branch line owing to the pressure difference between the exhaust air system and the unpressurized area acts as a heat sink of the heat exchanger. During ground operation, the control device can control the shut-off valve and the blower in such a way that the shut-off valve is closed and the air stream produced by the blower acts as a heat sink of the heat exchanger. In other words, the blower can be turned off during flight operation and the heat exchanger only cooled by air that flows through the branch line. During ground operation of the aircraft, the blower can be used to produce an air stream as a heat sink for the heat exchanger.

The blower can also be used optionally if the aircraft is flying at low altitudes. For this the control device can be configured to control the shut-off valve and the blower in such a way that a first air stream is created through the branch line on account of the pressure difference between the exhaust air system and the unpressurized area, and a second air stream is produced by the blower. Both air streams together act as a heat sink for the heat exchanger. The control device controls the second air stream produced by the blower for this, so that the cooling requirements to be met by the heat exchanger are achieved.

Depending on the design of the exhaust air system, the air stream through the air supply line and the branch line can also be produced by a conveying device in the exhaust air system. The areas such as the passenger cabin, the cargo hold and/or another area of the aircraft that is pressurized during flight operation, for example, are supplied with an adequate quantity of fresh air on the one hand, and on the other hand, a certain quantity of consumed air is removed from the area. Conveying devices such as blowers or fans are provided for this. These can already produce a sufficiently strong air stream, which is necessary for the operation of the heat exchanger. The control device can thus (even in ground operation) control the blower also as a function of the air stream already present from the exhaust air system. The blower can possibly even be dispensed with completely.

In addition, the area in which the inerting system is arranged can have openings in the outer skin of the aircraft. These serve for aeration or air ventilation of the area. These openings are advantageously used in ground operation to supply ambient air from outside the aircraft, which is conducted by the blower through the heat exchanger. It is likewise advantageous if the openings in the outer skin are arranged in such a way that an air stream can be created between an (inlet) opening, the blower, the heat exchanger and another (outlet) opening. It is also advantageous if these openings can be closed in flight operation of the aircraft, so that no vortices of the outer skin arise due to the openings.

In another configuration of the inerting system, the heat exchanger is cooled only by the blower. In other words, only the ambient air of the inerting system acts as a heat sink. The inerting system advantageously comprises an opening in the outer skin of the aircraft for this as well as a flap for closing and opening the opening. A control device of the inerting system can control the flap in such a way that the flap is closed during flight operation, and during ground operation of the aircraft the flap is open. In ground operation and when the flap is open, the blower can be arranged in such a way that it conveys ambient air from outside the aircraft through the opening and produces the air stream from this.

The blower is advantageously arranged directly behind or close to the flap, so that on the suction side of the blower, air is aspirated predominantly through the opening in the outer skin. The air is supplied to the heat exchanger on the pressure side of the blower by suitable mechanisms, such as e.g. pipes or other air ducting devices. Thus in ground operation and when the flap is open, air outside the aircraft can be used as a heat sink for the heat exchanger.

In addition or alternatively, the inerting system also comprises an air ducting device, which is arranged between the opening in the outer skin and the blower. The flap is arranged in this case in such a way that when the opening in the outer skin is closed, it opens an opening in the air ducting device into the interior of an area in which the inerting system is arranged, and when the opening in the outer skin is opened, it closes the opening in the air ducting device into the interior of the area in which the inerting system is arranged.

It is also advantageous if the outer skin of the aircraft in the area in which the inerting system is arranged can be used as a heat sink to the ambient air outside the aircraft. This is possible in areas of the aircraft in particular in which no (or only very little) heat insulation is arranged on the outer skin. For example, in a floor area of the aircraft or the tail area of the aircraft, the temperature falls during flight operation at a great altitude. Here temperatures of 10° C. maximum often prevail inside the aircraft. Cooling takes place exclusively via the outer skin in this area of the aircraft. In other words, the outer skin of the aircraft forms a heat exchanger to the ambient air outside the aircraft. In addition, this effect can be amplified by an outer skin heat exchanger. For example, a heat exchanger can be arranged in the outer skin at a certain point of the outer skin. Passive heat exchangers, which consist of lamella-shaped elements attached to the outside and/or inside of the outer skin, are especially advantageous for this. It is likewise advantageous if the suction side of the blower is arranged close to or above such an outer skin heat exchanger. In flight operation the air inside the aircraft in the area of the inerting system can thus be used exclusively for cooling the air supply for the IGGS. No other openings in the outer skin are necessary for this. Existing openings, which guarantee an adequate supply of (cooler) outside air in ground operation, for example, can be closed during flight operation. Vortices due to openings in the outer skin are thus avoided, due to which the fuel consumption of the aircraft falls.

The inerting system can also comprise a bypass line, which branches off from the air line downstream of the compressor and supplies the inert gas generation apparatus with compressed air from the compressor, circumventing the heat exchanger. The bypass line is brought back together with the air line leaving the heat exchanger, therefore. Control of the temperature of the air supplied to the inert gas generation apparatus can be realised by a control valve inside the bypass line. By merging of the air line downstream of the heat exchanger and of the bypass line, the temperature of the air for the IGGS can be controlled with a suitable degree of opening of the control valve. The use of such a control valve permits much finer temperature control than would be possible only by the heat exchanger. Even by controlling the blower or the air stream that flows through the heat exchanger as heat sink, the temperature of the air leaving the heat exchanger is not controlled as quickly and precisely as by a bypass line and control valve.

According to another configuration of the inerting system, the blower can be configured further to ventilate the area in which the inerting system is arranged. To avoid the accumulation of gases or other substances, the area in which the inerting system is arranged should be ventilated. Usually other components of the aircraft that require ventilation or also cooling by a (light) air stream are also arranged in this area. For example, tanks with liquids, such as e.g. a trim tank or a tank for holding aviation fuel for the APU, can be arranged in this area. Permanent ventilation of the area is thus prescribed, so that openings are already present in the outer skin. By dimensioning the blower and corresponding air ducting devices appropriately, the blower can not only supply the heat exchanger with air, but also achieve ventilation of the area in question. A separate ventilation blower can thus be eliminated. Furthermore, the aircraft can have closable and/or permanent openings in the outer skin in the area in which the inerting system is arranged to ventilate the area. Openings already present in the outer skin of the aircraft that are used to ventilate the area can thus also be used to supply ambient air to cool the heat exchanger during ground operation.

The inerting system can also have air ducting devices that are suitable to conduct the air heated in the heat exchanger to outlet openings in the outer skin of the aircraft. In particular, if the area in which the inerting system is arranged requires permanent ventilation, it is sensible to discharge the air heated by the heat exchanger to the outside. Openings already present in the outer skin can be used for this. The air stream after the heat exchanger must only be conducted accordingly to these openings. Closed lines or also guide plates can be used for this. In the case of the implementation variant in which air from the exhaust air system is used to cool the heat exchanger, it is also necessary to route this exhaust air out of the aircraft to the outside.

Alternatively, the air can be supplied following heating by the heat exchanger also to an air conditioning system of the aircraft. The heated air can thus also be routed back to an aircraft cabin or other area of the aircraft in some cases, due to which heating of the fresh air is at least partially eliminated. The fuel consumption can be reduced further by this.

The inert gas consumer can be an aviation fuel tank or a trim tank, from which air containing oxygen is displaced by inert gas. In addition or alternatively, a fire extinguishing device can be the inert gas consumer. To suppress sources of fire, inert gas can be introduced into the affected areas, so that the seat of a fire can be extinguished due to the reduction in oxygen.

According to another aspect of the disclosure herein, a method is provided for supplying an inert gas in an aircraft. The method comprises the tapping of air from an exhaust air system of the aircraft, compression of the tapped air and production of inert gas from the compressed air in an inert gas generation apparatus. By dispensing with bleed air for the production of inert gas, the fuel consumption is reduced, as less air is tapped from the engine.

In one configuration of the disclosure herein, the method also comprises cooling of the compressed air to a temperature necessary for the operation of the inert gas generation apparatus. The method also comprises, during flight operation of the aircraft, branching of air from the air tapped from the exhaust air system prior to compression, and use of the branched-off air as a heat sink to cool the compressed air, wherein the branched-off air flows due to a pressure difference between the exhaust air system and the air surrounding the inert gas generation apparatus. During ground operation of the aircraft, on the other hand, the method comprises production of an air stream by a blower from the air surrounding the inert gas generation apparatus, and use of the air stream as a heat sink for cooling the compressed air.

By using air from an area inside the aircraft, such as e.g. air from the exhaust air system or air that surrounds the inert gas generation apparatus, a ram air channel with corresponding opening in the outer skin can be dispensed with. By dispensing with another opening in the outer skin, a vortex on the outer skin is avoided or reduced. The fuel consumption of the aircraft is reduced by this.

In addition or alternatively, the method can also comprise control of a flap for closing and opening an opening in an outer skin of the aircraft and cooling of the compressed air to a temperature necessary for the operation of the inert gas generation apparatus. In this case, the method comprises, during flight operation of the aircraft, closing of the flap, production of an air stream by a blower from the air surrounding the inert gas generation apparatus, and use of the air stream as a heat sink to cool the compressed air. During ground operation of the aircraft, on the other hand, the method comprises opening of the flap, production of an air stream by the blower from the air surrounding the aircraft through the opening and use of the air stream as a heat sink for cooling the compressed air.

According to another aspect, an aircraft is provided in which an inerting system as explained above is arranged. In addition or alternatively, an inerting system can be used in the aircraft according to one of the methods described above.

BRIEF DESCRIPTION OF THE DRAWINGS

The various aspects and configurations of the present disclosure are now explained in greater detail with reference to the enclosed schematic drawings, of which.

DETAILED DESCRIPTION

Figure 1:
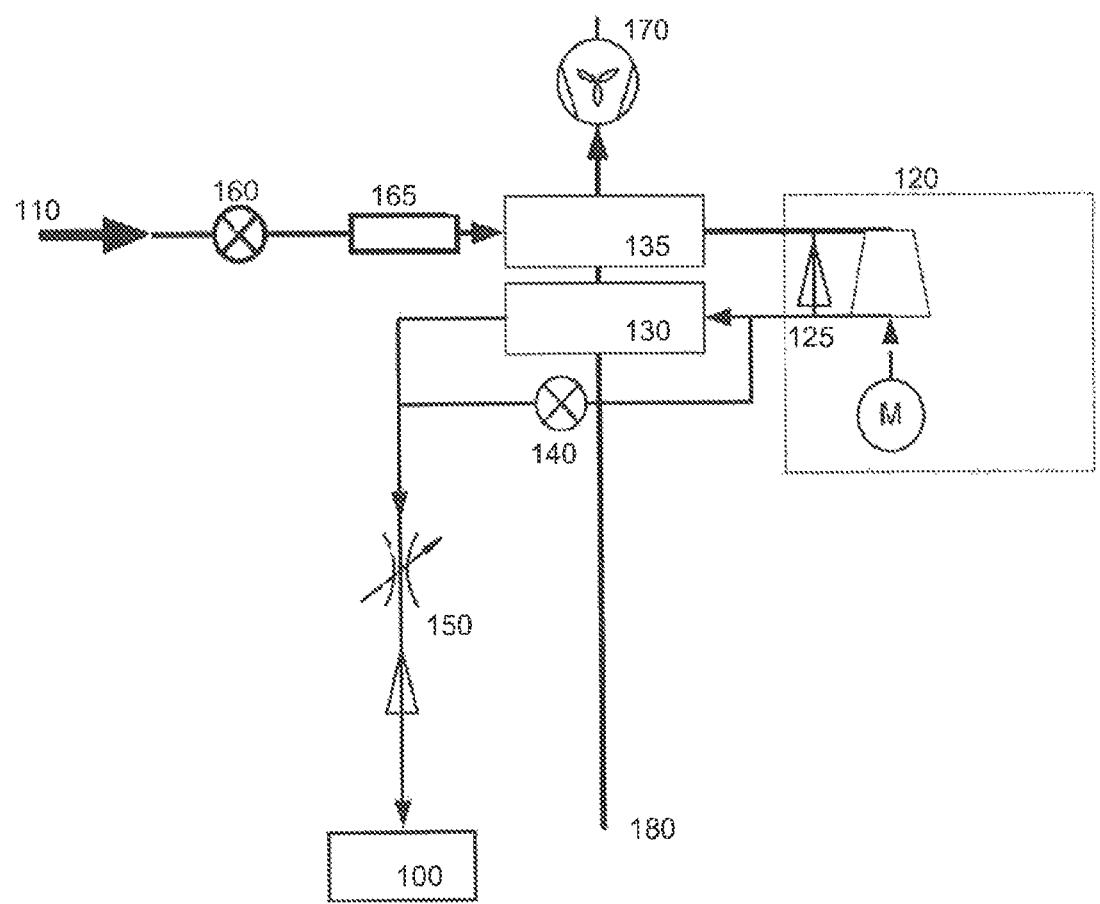
FIG. 1 is a schematic view of a known inert gas generation system (IGGS)
Figure 2:
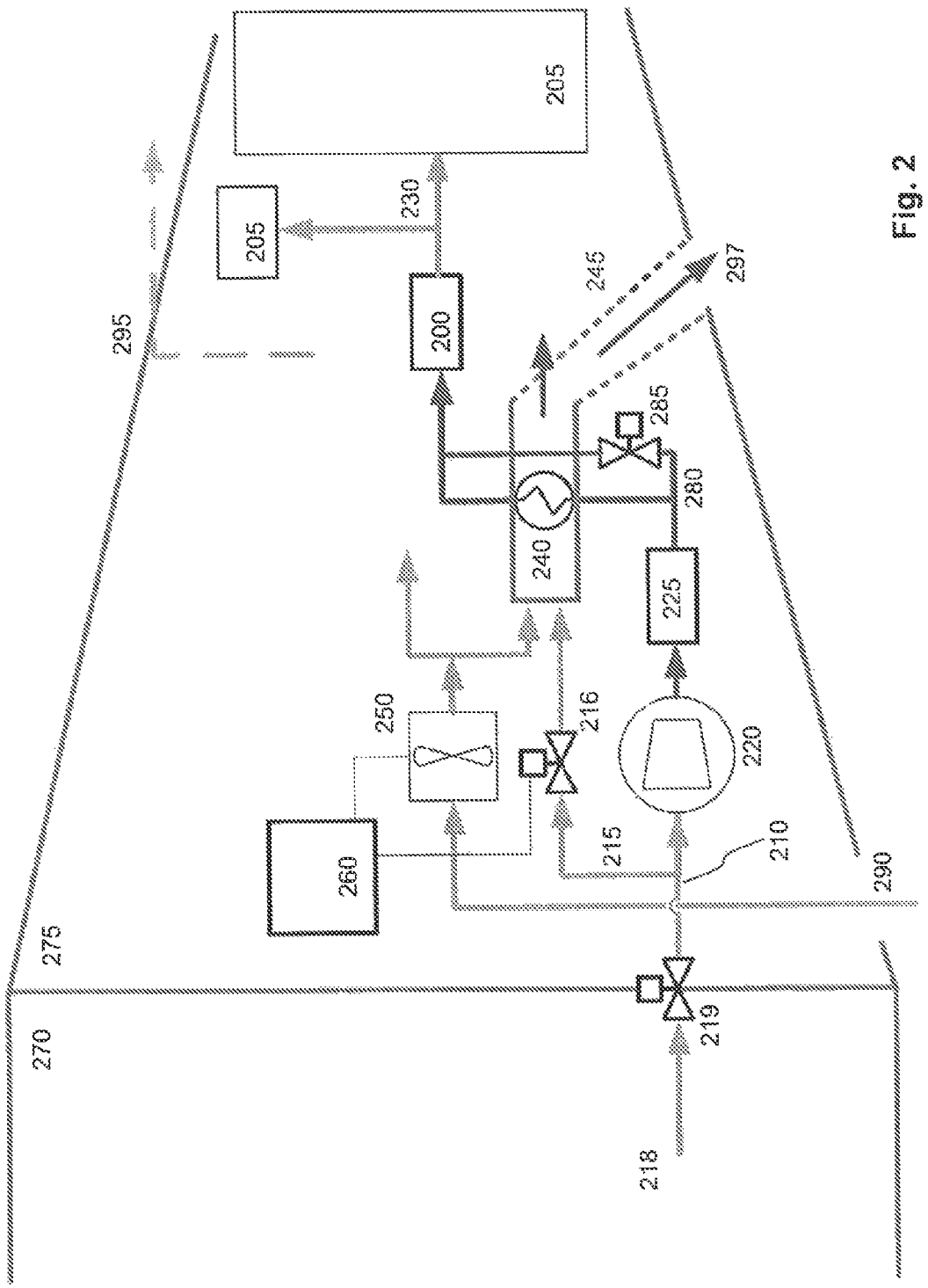
FIG. 2 is a schematic representation of a first aspect according to the disclosure herein for realising an inerting system.

According to a first variant of the present disclosure, an inerting system is provided such as is illustrated in FIG. 2. FIG. 2 shows an inerting system in a tail area of an aircraft. This area is especially suitable for explaining the disclosure herein, as two particular areas meet one another at this section of the aircraft. For one thing, a pressurized area 270, such as e.g. a passenger cabin and/or a cargo hold, mostly ends there. The tail area of the aircraft is usually an unpressurized area 275 and is used to accommodate various units and components necessary for the control of the aircraft. During flight operation, an ambient pressure tolerable for persons and living beings is maintained for passengers and living beings on board the aircraft in the area 270, while in the area 275 the pressure falls according to the aircraft environment. At great altitudes in particular, a notable pressure difference thus prevails between these two areas.

According to the disclosure herein, an inerting system is provided in the unpressurized area 275, which system comprises an inert gas generation apparatus 200 (also termed inert gas generating system—IGGS—in the present disclosure). To supply the IGGS 200 with air for the production of inert gas, an air supply line 210 is provided. This air supply line carries air to a compressor 220, which supplies the IGGS 200 with air from the air supply line at a pressure necessary for operation of the IGGS 200. An ozone converter 225 can optionally be installed after the compressor, which converter removes ozone from the compressed air. The air heated by the compressor 220 will be brought to a certain operating temperature, predominantly cooled, for the IGGS 200. A heat exchanger 240 is connected for this ahead of the IGGS 200 and downstream of the compressor 220. An air stream, which is branched off from the air supply line 210 via a branch line 215, serves as a heat sink for the heat exchanger. A shut-off valve 216 is also provided in the branch line 215, which valve can control the flow rate through the branch line 215. The air stream serving the heat exchanger 240 as a heat sink is thus adjustable.

As can be gathered from FIG. 2, no separate blower or ventilator is required for the air stream through the branch line 215. The air supply line 210 is connected to an exhaust air system 218 for this. During flight operation of the aircraft, a pressure difference prevails between the areas 270 and 275. A natural air stream is thus created between the exhaust air system 218 to the heat exchanger 240 by the supply line 210, the branch line 215 and the shut-off valve 216. This pressure difference is sufficient according to the disclosure herein to supply the heat exchanger 240 with enough exhaust air from the area 270 to achieve cooling of the compressed air for the IGGS 200.

During ground operation of the aircraft, no pressure difference usually prevails between the areas 270 and 275. To be able nevertheless to operate the IGGS 200, an air stream is provided by a blower 250 as a heat sink for the heat exchanger 240. The blower 250 can also be operated while the aircraft is in flight mode. For example, at lower flight altitudes the pressure difference between the areas 270 and 275 could be too small for the air stream between the exhaust air system 218 and the heat exchanger 240 to suffice for cooling the latter.

The exhaust air system 218 can itself comprise a blower or a ventilator, however, to convey air from the area 270 to the environment. In this case an adequate air stream could prevail in the air supply line 210 and the branch line 215 even in ground operation. To be able to achieve adequate cooling in the heat exchanger 240, a control device 260 is provided, which controls the shut-off valve 216 and the blower 250 in such a way that an adequate air stream is present as a heat sink at the heat exchanger 240. The control device 260 is coupled for this to suitable temperature, air volume flow and/or pressure sensors (not shown) to determine whether the heat exchanger 240 has sufficient air available as a heat sink.

The air heated in the heat exchanger 240 can be emitted into the area 275, in which the inerting system is arranged. In this case, the heated air is emitted via existing openings 295 to the outside area of the aircraft. This area of the aircraft is usually already provided with such openings 295 to facilitate ventilation of the area. In addition or alternatively, an air ducting device 245 can be arranged in the area 275. This air ducting device 245 can be implemented in the form of air guide plates or lines. Due to this (these) air ducting device(s) 245, the air heated in the heat exchanger 240 is discharged outwards, thus outside the aircraft, through a suitable opening 297. An inlet opening 290 is usually also provided for the ventilation of the area 275. An air stream can thus be produced by the blower 250, which stream conveys air outside the aircraft through the opening 290 into the area 275 and through the heat exchanger 240 as a heat sink. In an advantageous configuration, the blower 250 is configured and arranged in such a way that it also ventilates the area 275. As identified by the arrows in FIG. 2, a portion of the air stream produced by the blower 250 can be conducted for this through the heat exchanger 240, while another portion flows into the area 275. Ventilation of the area 275 can be achieved by the blower 250 through the corresponding openings 290 and 295 and their, for example opposing, arrangement. Instead of the opening 290, air can also be discharged from another area of the aircraft, for example from the exhaust air system 218 or another exhaust air system of another area of the aircraft (not shown).

The inert gas produced in the inert gas generation apparatus 200 is conducted by a suitable inert gas line 230 to one or more inert gas consumers 205. These inert gas consumers can be an aviation fuel tank or a trim tank in the tail area of the aircraft. Inert gas can also be conducted to a fire extinguisher system via a corresponding inert gas line 230.

Figure 3:
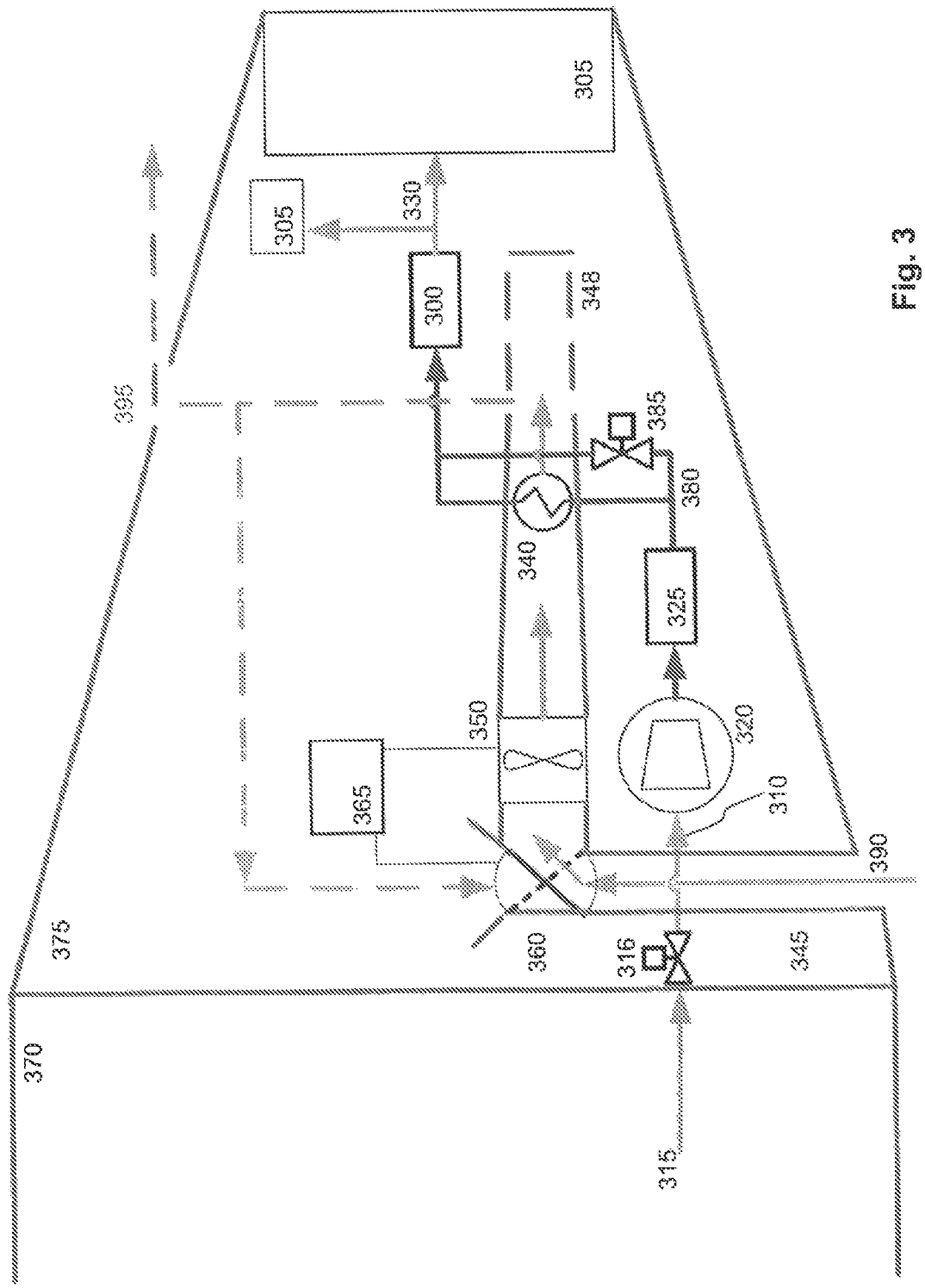
FIG. 3 is a schematic representation of a second aspect according to the disclosure herein for realising an inerting system.

According to another implementation variant of the present disclosure, an inerting system is provided that has a different construction, at least in sections, than the inerting system according to FIG. 2. Another such implementation variant is shown in FIG. 3. For example, this alternative inerting system also comprises an inert gas generation apparatus 300 (also termed IGGS), an air supply line 310, a compressor 320, an optional ozone converter 325 and a heat exchanger 340 for cooling the compressed air prior to supplying it to the IGGS 300. In this implementation variant also, the air supply line 310 is connected to an exhaust air system 315. The air supply line 310 can be separated from the exhaust air system 315 or connected to it by a shut-off valve 316. The inerting system can optionally also comprise a bypass line 380 and corresponding control valve 385 to facilitate fast, precise temperature control of the air supplied to the IGGS 300. Furthermore, a blower 350 is provided here too. This blower 350 can produce an air stream, which serves as a heat sink for the heat exchanger 340. Finally, even the inerting system according to this implementation variant has an inert gas line 330, which conveys inert gas to an inert gas consumer 305.

Although in FIG. 3 two areas 370 and 375 are also shown, a pressurized and an unpressurized area need not necessarily be involved here, however. In contrast to the implementation variant according to FIG. 2, the air supply line 310 in the implementation variant according to FIG. 3 is only connected to the compressor 320. The compressor can convey sufficient air from the exhaust air system 315 via the air supply line to supply the IGGS 300 with an accordingly adequate air quantity. In this implementation variant the air supply line 310 can alternatively be coupled to another air supply or removal system of the aircraft instead of the exhaust air system 315. In another alternative configuration, the air supply line 310 can also end in any other area inside the aircraft, for example in areas that require ventilation.

The implementation variant according to FIG. 3 also comprises an opening 390 in the outer skin of the aircraft and a flap 360 for closing and opening the opening 390. Opening and closing of the flap 360 can be controlled by a control device 365. Furthermore, the control device 365 can also control the blower 350. The flap 360 is advantageously opened during ground operation. The blower 350 is arranged in such a way that it conveys air from outside the aircraft via the opening 390. This can be effected in that the flap 360 and the blower 350 are arranged directly on or very close to the outer skin and thus the opening 390. As a result, the air aspirated by the blower 350 is conveyed almost exclusively via the opening 390. Alternatively, the opening 390 can be connected to the blower 350 via an air line 345. The flap 360 is arranged in such an air line 345 in such a way that it causes an air stream from the opening 390 through the air line 345 to the blower 350 in ground operation.

In an advantageous configuration, the air line 345 has an opening upstream of the blower 350, which is closed by the flap 360 if the path through the air line 345 from the opening 390 to the blower 350 is open. Correspondingly, when the flap 360 is flipped, the air line 345 to the opening 390 is closed, while the opening in the area 375 is open, as is shown in FIG. 3.

The flap 360 can also be arranged alternatively directly on the opening 390, and close the outer skin there. In this case the flap is used as part of the air ducting device 345 when in the open state. In the closed state it opens an opening in the air ducting device 345 into the interior of the area 375 in which the inerting system is arranged.

In each case the flap 360 is able to close the opening 390 (or a corresponding section of the air line 345 to the opening 390). This enables the blower 350 to convey air from the area 375 through the heat exchanger 340 during flight operation. As shown in FIG. 3, an air line 345 runs from the blower 350 on to the heat exchanger 340. The air heated in the heat exchanger 340 is then simply emitted afterwards to the air inside the area 375. FIG. 3 shows here an air line 348 shown as a dashed line for conducting the air heated in the heat exchanger 340 into the area 375. As shown by dashed arrows in FIG. 3, an air circuit can thus be created inside the area 375. In the section of this air circuit shown by dashed lines, the air can be cooled during flight operation in particular in that the area 375 is cooled via the outer skin of the aircraft. At high flight altitudes in particular, a low temperature prevails in an uninsulated or slightly insulated area 375, for example of 10° C. or less. If this cold air is now conveyed in the area 375 through the heat exchanger 340, it is normally sufficient to cool the air stream to the IGGS 300 adequately. The outer skin of the aircraft thus acts here as a heat exchanger to the outside.

Alternatively or in addition, the area 375 can also have another opening 395 in the outer skin of the aircraft. Air from the area 375 can be discharged to the aircraft surroundings through an opening 395 of this kind.

Figure 4:
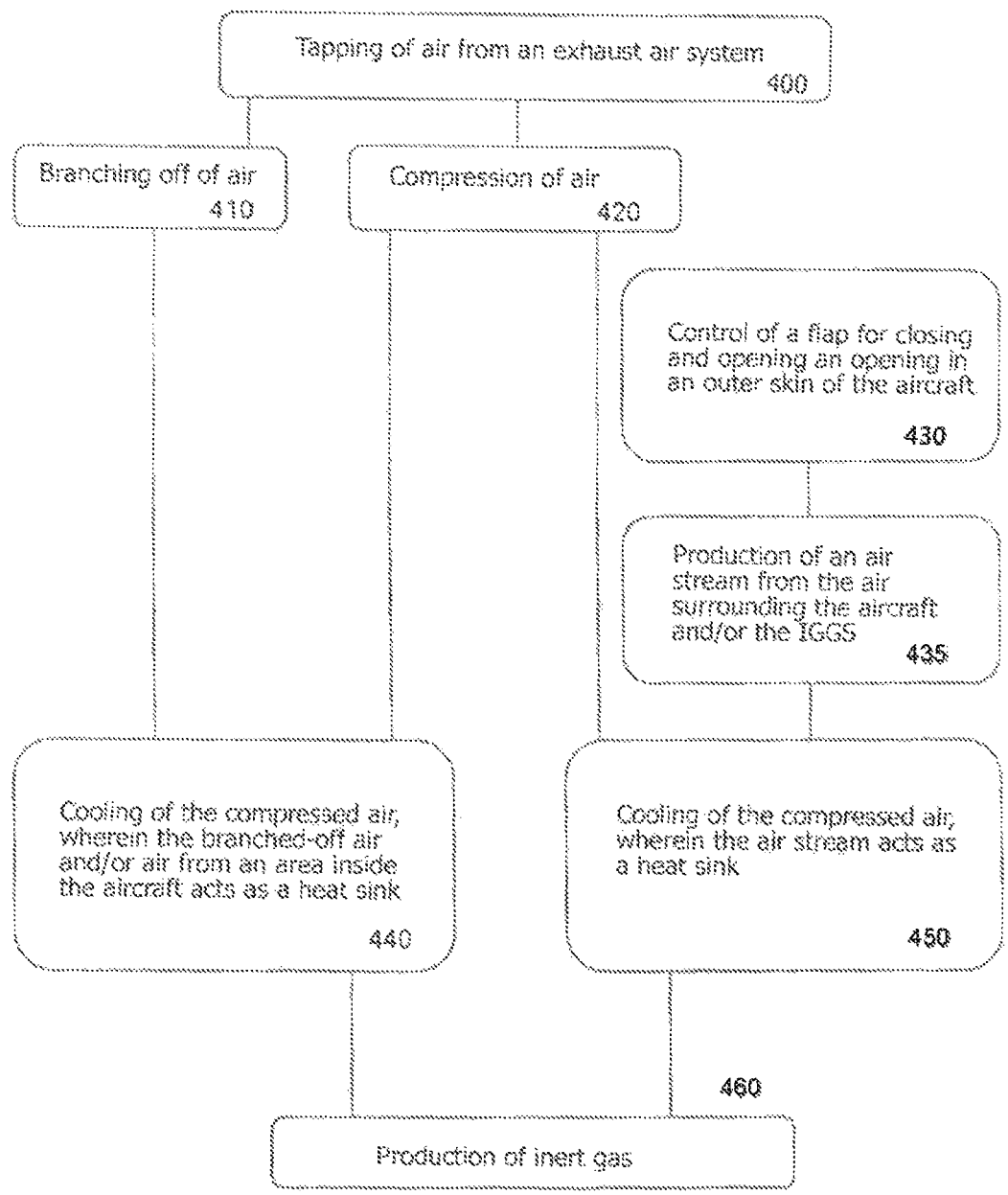
FIG. 4 is a block diagram of a sequence of a method according to the disclosure herein.

The present disclosure is now summarized with reference to an exemplary method, which is shown in FIG. 4 as a block diagram. The method is used to supply an inert gas in an aircraft and comprises the tapping 400 of air from an exhaust air system of the aircraft, compression 420 of the tapped air and production 460 of inert gas from the compressed air in an inert gas generation apparatus. By dispensing with bleed air for the production of inert gas, the fuel consumption is reduced, as less air is tapped from the engine.

In a first configuration of the disclosure herein, the method further comprises cooling 440 of the compressed air to a temperature necessary for the operation of the inert gas generation apparatus. In this case the method further comprises, during flight operation of the aircraft, branching off 410 of air from the air tapped from the exhaust air system prior to compression 420. The branched-off air can be used as a heat sink for cooling the compressed air, wherein the branched-off air flows due to a pressure difference between the exhaust air system and the air surrounding the inert gas generation apparatus. During ground operation of the aircraft, on the other hand, the method comprises production of an air stream by a blower from the air surrounding the inert gas generation apparatus. In this case the air stream generated is used as a heat sink for cooling the compressed air.

By using air from an area inside the aircraft, such as e.g. air from the exhaust air system or air that surrounds the inert gas generation apparatus, a ram air channel with corresponding opening in the outer skin can be dispensed with. By dispensing with a further opening in the outer skin, a vortex on the outer skin is avoided or reduced. The fuel consumption of the aircraft is reduced by this.

In a second configuration of the disclosure herein, the method further comprises control 430 of a flap for closing and opening an opening in an outer skin of the aircraft and cooling 450 of the compressed air to a temperature necessary for the operation of the inert gas generation apparatus. In this case the method comprises, during flight operation of the aircraft, closing of the flap and production 435 of an air stream by a blower from the air surrounding the inert gas generation apparatus. In this state the air stream of the blower can be used as a heat sink for cooling the compressed air. During ground operation of the aircraft, on the other hand, the method comprises opening of the flap and production 435 of an air stream by the blower from the air surrounding the aircraft through the opening. In this case the air stream is also used as a heat sink for cooling 450 the compressed air. Now, however, air from outside the aircraft can also be used for cooling 450. In flight operation, vortices are avoided due to the closed flap, due to which the fuel consumption falls.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for supplying an inert gas in an aircraft, wherein the method comprises:
   tapping air from an exhaust air system of the aircraft;
   compressing the tapped air;
   producing inert gas from the compressed air in an inert gas generation apparatus;
   cooling the compressed air to a temperature necessary for operation of the inert gas generation apparatus;
   wherein during flight operation of the aircraft, the method comprises:
      branching off air from the air tapped from the exhaust air system prior to compression; and
      using the branched-off air as a heat sink for cooling the compressed air, wherein the branched-off air flows due to a pressure difference between the exhaust air system and the air surrounding the inert gas generation apparatus; and
   during ground operation of the aircraft the method comprises:
      producing an air stream by a blower from the air surrounding the inert gas generation apparatus; and
      use of the air stream as a heat sink for cooling the compressed air.

2. The method according to claim 1, comprising using the method on an aircraft.

3. A method for supplying an inert gas in an aircraft, the method comprising:
   tapping supply air from an exhaust air system of the aircraft;
   connecting an air supply line from the exhaust air system of the aircraft to a compressor;
   compressing, using the compressor, the supply air to generate compressed air having a pressure necessary for operation of an inert gas generation apparatus;
   cooling, using a heat exchanger, the supply air from the compressor to a temperature necessary for operation of the inert gas generation apparatus;
   connecting a bypass line downstream of the compressor such that at least a portion of the supply air circumvents the heat exchanger to control a temperature of the supply air input into the inert gas generation apparatus;
   producing inert gas from the compressed air in an inert gas generation apparatus;
   during flight operation of the aircraft:
      branching off a portion of the supply air from the exhaust air system upstream from the compressor; and
      providing the portion of the supply air to the heat exchanger as a heat sink for cooling the compressed air, wherein the portion of the supply air flows through the heat exchanger due to a pressure difference between the exhaust air system and ambient air surrounding the inert gas generation apparatus; and
   during ground operation of the aircraft:
      producing an ambient air stream, using a blower, from the ambient air surrounding the inert gas generation apparatus; and
      providing the ambient air stream to the heat exchanger as a heat sink for cooling the compressed air.

4. The method according to claim 3, comprising using the method on an aircraft.

5. A method for supplying an inert gas in an aircraft, wherein the method comprises:
   tapping air from an exhaust air system of the aircraft;
   compressing the tapped air;
   producing inert gas from the compressed air in an inert gas generation apparatus;
   controlling a flap for closing and opening an opening in an outer skin of the aircraft; and
   cooling the compressed air to a temperature necessary for operation of the inert gas generation apparatus;
   wherein during flight operation of the aircraft, the method comprises:
      closing the flap; and
      producing an air stream by a blower from the air surrounding the inert gas generation apparatus; and
      using the air stream as a heat sink for cooling the compressed air; and
   during ground operation of the aircraft the method comprises:
      opening of the flap;
      producing an air stream by the blower from the air surrounding the aircraft through the opening; and
      using the air stream as a heat sink for cooling the compressed air.

6. A method for supplying an inert gas in an aircraft, the method comprising:
   tapping supply air from an exhaust air system of the aircraft;
   connecting an air supply line from the exhaust air system of the aircraft to a compressor;
   compressing, using the compressor, the supply air to generate compressed air having a pressure necessary for operation of an inert gas generation apparatus;
   cooling, using a heat exchanger, the supply air from the compressor to a temperature necessary for operation of the inert gas generation apparatus;
   connecting a bypass line downstream of the compressor such that at least a portion of the supply air circumvents the heat exchanger to control a temperature of the supply air input into the inert gas generation apparatus;
   producing inert gas from the compressed air in an inert gas generation apparatus;
   controlling a flap for closing and opening an opening in an outer skin of the aircraft;
   during flight operation of the aircraft:
      closing the flap;
      producing an ambient air stream, using a blower, from ambient air surrounding the inert gas generation apparatus; and
      providing the ambient air stream to the heat exchanger as a heat sink for cooling the compressed air; and
   during ground operation of the aircraft:
      opening the flap;
      producing an ambient air stream, using the blower, from ambient air surrounding the aircraft through the opening; and providing the ambient air stream to the heat exchanger as a heat sink for cooling the compressed air.

* * * * *